(12) United States Patent  (10) Patent No.: US 8,530,802 B2
Yamamoto                        (45) Date of Patent:   Sep. 10, 2013

(54) CERAMIC HEATER AND MOLD

(75) Inventor: Ken Yamamoto, Kirishima (JP)

(73) Assignee: Kyocera Corporation, Kyoto (JP)

( * ) Notice: Subject to any disclaimer, the term of this patent is extended or adjusted under 35 U.S.C. 154(b) by 643 days.

(21) Appl. No.: 12/593,724

(22) PCT Filed: Mar. 26, 2008

(86) PCT No.: PCT/JP2008/055692
§ 371 (c)(1),
(2), (4) Date: Feb. 2, 2010

(87) PCT Pub. No.: WO2008/123296
PCT Pub. Date: Oct. 16, 2008

(65) Prior Publication Data
US 2010/0155389 A1    Jun. 24, 2010

(30) Foreign Application Priority Data

Mar. 29, 2007   (JP) .................................. 2007-087520

(51) Int. Cl.
*H05B 3/10*    (2006.01)

(52) U.S. Cl.
USPC ........... 219/548; 219/267; 219/270; 219/504; 219/505; 219/538; 219/541; 219/544; 219/546; 219/553; 29/611; 29/613; 29/620; 29/270; 123/145 R

(58) Field of Classification Search
USPC ................. 219/267, 270, 504, 505, 538, 541, 219/542, 544, 546, 548, 553; 29/611, 613, 29/620, 270; 123/145 R
See application file for complete search history.

(56) References Cited

U.S. PATENT DOCUMENTS

| | | | |
|---|---|---|---|
| 5,264,681 A * | 11/1993 | Nozaki et al. | 219/544 |
| 6,646,231 B2 | 11/2003 | Hotta et al. | 219/270 |
| 6,720,530 B2 * | 4/2004 | Taniguchi et al. | 219/270 |
| 2002/0175156 A1 | 11/2002 | Hotta et al. | 219/270 |

FOREIGN PATENT DOCUMENTS

| | | |
|---|---|---|
| JP | 07052189 A | 2/1995 |
| JP | 2002203665 A | 7/2002 |
| JP | 2002-299012 | 10/2002 |
| JP | 2003-285314 | 10/2003 |
| JP | 2003285314 A | 10/2003 |
| JP | 2005-135869 | 5/2005 |

OTHER PUBLICATIONS

Extended European search report dated Apr. 4, 2012 issued in corresponding European application 08722857.3.

* cited by examiner

*Primary Examiner* — Meiya Li
(74) *Attorney, Agent, or Firm* — DLA Piper LLP (US)

(57) ABSTRACT

A ceramic heater includes a heating resistor including a first conducting portion and a second conducting portion which face each other and a ceramic base in which the heating resistor is embedded. The first conducting portion includes a first burr which extends from the first conducting portion and is located between the first conducting portion and the second conducting portion. The second conducting portion includes a second burr which extends from the second conducting portion and is located between the second conducting portion and the first conducting portion. At least a part of the first and second burrs is spaced apart from the line linking a starting point of the first burr and a starting point of the second burr in a cross-section perpendicular to a conduction direction of the first and second conducting portions.

13 Claims, 7 Drawing Sheets

(a)

(b)

(a)

(b)

CERAMIC HEATER AND MOLD

CROSS-REFERENCE TO THE RELATED APPLICATIONS

This application is a national stage of international application No. PCT/JP2008/055692 filed Mar. 26, 2008, which also claims the benefit of priority under 35 USC 119 to Japanese Patent Application No. 2007-087520 filed Mar. 29, 2007, the entire contents of which are incorporated herein by reference.

FIELD OF THE INVENTION

The present invention relates to ceramic heaters and mold to be used to manufacture the ceramic heaters.

BACKGROUND OF ART

Conventionally, ceramic heaters have been used as heaters such as an ignition heater for oil fan heater and a heater of a glow plug for starting facilitation used in a diesel engine.

The ceramic heaters comprises a U shaped heating element and electrode lead terminals connected to the ends of the U shaped heating element embedded in a stick insulating body (For example, paragraph 0027 of document 1). In the document 1, there is a description that an injection molded heating compact is made by a mold where electrode lead terminals are fixed at predetermined positions and then burrs of the injection molded heating compact are removed by laser beam (For example, paragraphs 0028-0033 of document 1). In addition, there is a description that the heating compact is housed and integrated in a concave portion of a separated insulating member and then fired (For example, paragraphs 0035-0037 of document 1).

Document 1: Japanese Unexamined Patent Publication (Kokai) No. 2003-285314

Problem to be Solved by the Invention

However, in the ceramic heater and the method for production thereof disclosed in the document 1, there are problems that the removing burrs is inferior in workability and that it is necessary to put and integrate the molded heating compact after preparing the separated insulating member in addition to the molded heating compact, thereby increasing number of operation, which prevent to manufacture at low cost.

An object of the present invention is to provide a ceramic heater which can be easily manufactured.

Means for Solving the Problem

To achieve the above object, the ceramic heater according to the present invention comprises a heating resistor comprising a first conducting portion and a second conducting portion which face each other, the first conducting portion comprising a first burr which extends from the first conducting portion and is located between the first conducting portion and the second conducting portion, the second conducting portion comprising a second burr which extends from the second conducting portion and is located between the first conducting portion and the second conducting portion; and a ceramic base in which the heating resistor is embedded.

And at least part of at least one of the first and second burrs is spaced apart from a line linking a starting point of the first burr and a starting point of the second burr in a cross-section perpendicular to a conduction direction of the first and second conducting portions.

In the ceramic heater according to the present invention, a leading end of at least one of the burrs may be spaced apart from the line.

Effect of The Invention

In the ceramic heater of the present invention constituted above, even if burrs are formed, since a distance between the burrs may become relatively large, it is possible to eliminate the step of removing the burrs, thereby making it possible to manufacture at a low cost.

EXPLANATION OF NUMERALS

Figure 1A:
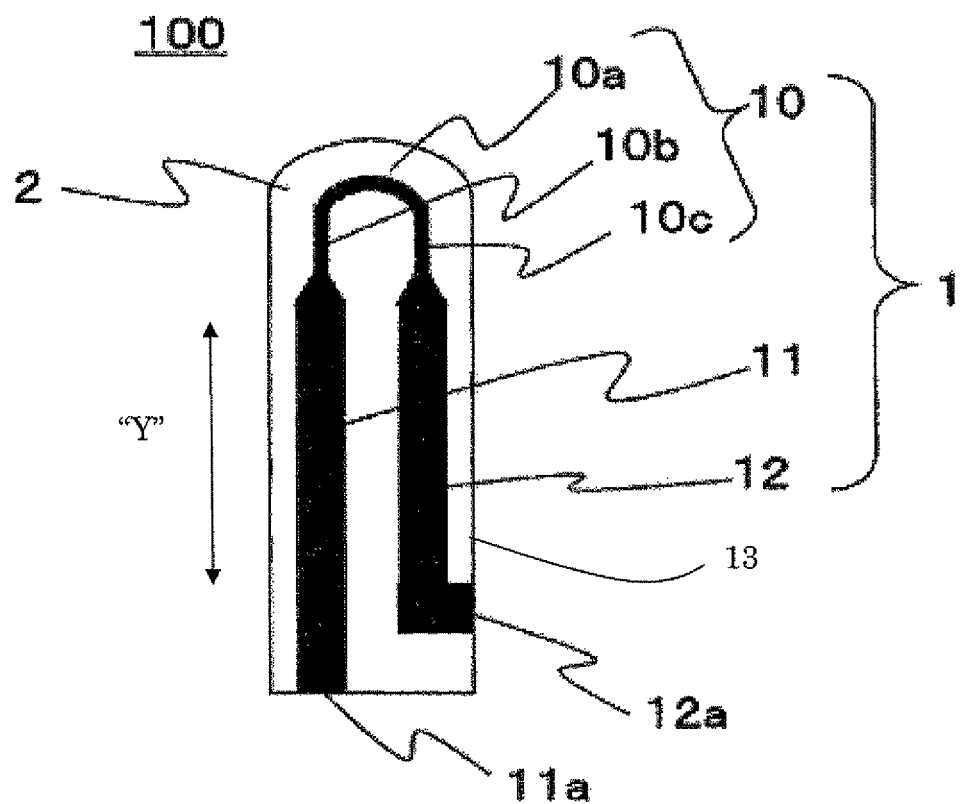
FIG. 1A is a sectional view showing a ceramic heater of the embodiment according to the present invention.

1: heating resistor, 1b: burr, 1g: heating resistor portion, 2: ceramic base, 2g: ceramic base compact, 10: heating portion, 11, 12: lead portion, 10a: first conduction portion, 10b: second conduction portion, 10c: third conduction portion, 50:

first mold, 51: first upper mold, 52: first lower mold, 52R: concave portion, 51P: convex portion, 53: second upper mold, 54: second lower mold.
13: An outer surface of the ceramic base
"Y": A conduction direction of the first and second conducting portions
14: A first burr
16: A starting point of the first burr
17, 20: A leading end of the first burr
15: A second burr
18: A starting point of the second burr
19, 21: A leading end of the second burr
$L_1$: A line
"A": A first region, also referred to as "one of regions"
"B": A second region, also referred to as "the other of regions"
$D_1$: A distance between the starting points
$D_2$: A distance between the leading points

BEST MODE FOR CARRYING OUT THE INVENTION

Referring to the drawings, ceramic heaters of embodiments according to the present invention will be described below.

Figure 1B:
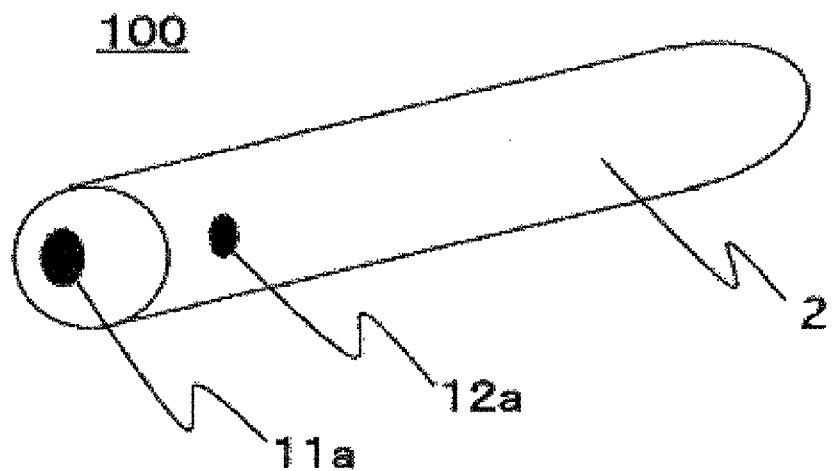
FIG. 1B is a perspective view showing an outward appearance of the ceramic heater of FIG. 1A.

The ceramic heater 100 of the embodiment according to the present invention is formed of a heating resistor 1 embedded in a ceramic base 2 of insulator as shown in FIGS. 1A and 1B.

In the ceramic heater 100 of this embodiment, the heating resistor 1 is a conductor composed of a heating portion 10 and a pair of lead portions 11, 12 which are connected to end portions of the heating portion. Current applied through the lead portions 11, 12 produces heat in the heating portion 10. The heating portion 10 is a U shape and comprises a first conduction portion 10a of arc shape and a second conduction portion 10b and a third conduction portion 10c which respectively stretch from both ends of the first conduction portion 10a in a same direction. The end portions of the second conduction portion 10b and the third conduction portion 10c are respectively connected to lead portions 11, 12.

In the embodiment, the lead portions 11, 12 are made of a material same as the heating portion 10 so as to be monolithically integrated with the second conduction portion 10b and third conduction portion 10c respectively and are formed in a same direction. The lead portions 11, 12 are formed in a diameter larger than the heating portion 10 to have a resistance per unit length lower than the heating portion. In the embodiment, the lead portion 11 is formed in a same direction of the second conduction portion 10b and a principle portion except for the other portion of the lead portion 12 is formed in a same direction of the third conduction portion 10c. As a result, the lead portion 11 and the lead portion 12 are arranged almost in parallel. In addition, as shown in FIG. 1A, the second conduction portion 10b and the lead portion 11 which extend in a same direction of the second conduction portion 10b, and the third conduction portion 10c and the principle portion of the lead portion 12 which extends in a same direction of the third conduction portion 10c are formed almost parallel with longitudinal direction of the ceramic base. An end face of the lead portion 11 is exposed at an end face of the ceramic base to form an electrode exposed portion 11a. An end face of the other end portion of the lead portion 12 is exposed at a side face of the ceramic base to form an electrode exposed portion 12a.

In the ceramic heater 100 constituted above, a portion (first conducting portion) which is composed of the second conduction portion 10b and the lead portion 11, and a portion (second conducting portion) which is composed of the third conduction portion 10c and the lead portion 12 are arranged almost parallel with each other to form opposing portions at a relatively narrow distance to form, which improves a withstand voltage characteristic between the opposing portions.

In the ceramic heater 100, an end portion of the burr formed at one of the two opposing portions arranged parallel with each other in a direction toward the other opposing portion and an end portion of the burr formed at the other opposing portion in a direction toward the one opposing portion are bended when the burrs with a length longer than a definite length are formed, which avoid getting close in a definite distance. As a result, since the leading ends are bended as shown in FIG. 6(a) in the ceramic heater 100, the leading end of one burr formed at one of the two opposing portions and the leading end of the other burr formed at the other opposing portion are spaced apart from a line linking a starting points of both burrs in a cross-section perpendicular to a longitudinal direction of the opposing portion. When the burrs are short, bended portions are not formed shown in FIG. 5(a). In the embodiment, the starting point is a center in a width direction of a root of burr. More concretely, when the circumferences of the heating resistor positioned both sides of the root of burr are extrapolated to be located, the starting point is a center of a line linking two points of intersection of the extrapolation line with the root of burr. The locating with extrapolation means that for example when the circumference is formed in arc shape, the circumference line is extended with an arc line of curvature same as the circumference and when the circumference is formed in straight line, the line is extended.

In the ceramic heater 100 constituted above of the embodiment, even if the burrs are formed by molding in the manufacturing process, high reliability is ensured, making it possible to mold the ceramic base portion in subsequent to mold the heating resistor portion as described below, which enables to manufacture at a low cost. The opposing portion, which is a part of a conductor constituting the heating resistor, means the first conducting portion and the second conducting portion which face across only ceramics forming the ceramic base.

Preferable materials for forming the heating resistor and the ceramic base are described below.

<Heating resistor 1>

A well-known material of electrical conductive ceramics such as tungsten carbide (WC), molybdenum disilicide ($MoSi_2$) tungsten disilicate ($WSi_2$) may be used as a material of the heating resistor 1. An example in which tungsten carbide is used is described. WC powder is prepared and then an electrical insulating ceramics such as silicon nitride ceramics which is a main component of the ceramic base is preferably added to the WC powder to decrease a difference from the ceramic base in coefficient of thermal expansion. Changing the percentage of insulating ceramics content and the percentage of electrical conductive ceramics content makes it possible to adjust the electrical resistance of the heating resistor for disable value. While the heating resistor may be formed by pressing a ceramic raw material powder that silicon nitride ceramics which is a main component of the ceramic base is added to WC powder as an insulating ceramics, it is preferable to be molded by injection molding that the shapes may be determined flexibly according to mold shapes.

<Ceramic Base 2>

Alumina ceramics or silicon nitride ceramics which have a superior insulating property at high temperature is preferably used as a material to compose the ceramic base. Particularly, the silicon nitride ceramics which has a high endurance property at a quick heat-up is more preferably used. The constitution of the silicon nitride ceramics has a form in which main phase particles mainly composed of the silicon nitride ($Si_3N_4$) are combined with a grain boundary phase originated a component of sintering aids. A part of the silica (Si) or a part of the nitride (N) may be substituted by aluminum (Al) or oxygen (O) in the main phase and a metal atom such as Li, Ca, Mg or Y may form a solid solution with the phase. While the ceramic base may be manufactured by pressing the ceramic raw material powder of the silicon nitride powder added with the sintering aids made of an oxide of rare earth element such as ytterbium (Y), yttrium (Y), erbium (Er) using a well-known pressing method, the ceramic base may be preferably manufactured by using an injection molding that the shapes may be determined flexibly according to mold shapes.

In the Embodiment, the ceramic material of the ceramic base 2 is molded integrated with the heating resistor 1 and fired. These are integrated after firing. To insulate between the opposing portions of the heating resistor 1, the ceramic base 2 preferably has an enough insulating property in a range from −20 to 1500° C. and preferably has an insulating property which is $10^8$ times the heating resistor or more.

A method of manufacturing the ceramic heater 100 will be described bellow.

Figure 2A:
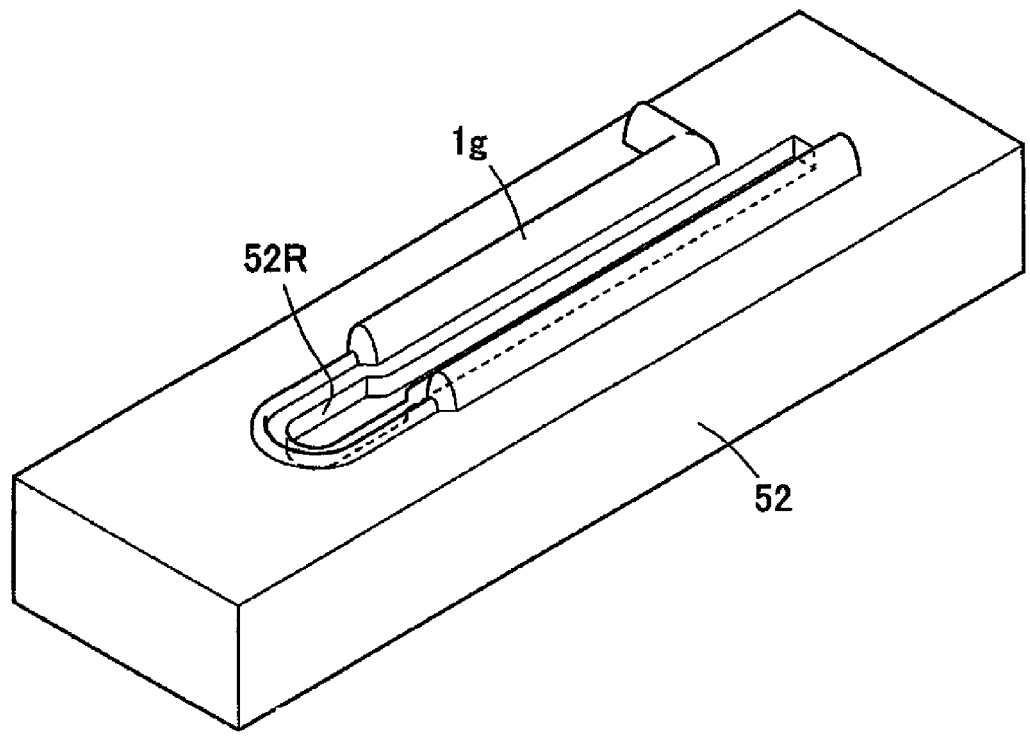
FIG. 2A is a perspective view of a first lower mold used for molding a heating resistor portion in the embodiment.
Figure 2B:
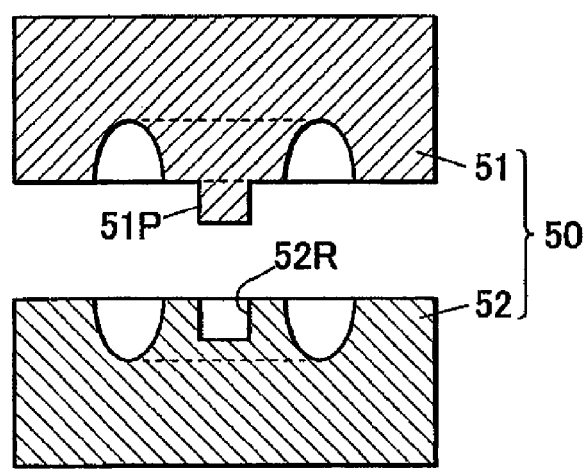
FIG. 2B is sectional views of a first lower mold and a first upper mold used for molding a heating resistor portion in the embodiment.

In the method, a first mold 50 for molding the heating resistor is prepared. The first mold 50 is composed of a first upper mold 51 and a first lower mold 52 which form a cavity corresponding to the shape of the heating resistor 1 when putting together. The first lower mold 52 is showed together with a heating resistor portion 1g in the perspective view of FIG. 2A and the first upper mold 51 and the first lower mold 52 facing each other are showed in the sectional view of FIG. 2B.

In the first mold 50, a concave portion 52R is formed between the cavities for forming the opposing portions of the heating resistor 1g in parallel to the cavities in the first lower mold 52 (FIG. 2A and FIG. 2B) and protrude portion 51P which is to be fitted to the concave portion 52R is formed in the first upper mold 51. That is, steps are formed between the two opposing portions in the matching surfaces of the first upper mold 51 and the first lower mold 52. When the heating resistor portion 1g is molded, even if burrs are formed, the concave portion 52R formed in the first lower mold 52 and the protrude portion 51P formed in the first upper mold 51 lead to bend the burr along by wall surface without going across the protrude portion 52P (FIG. 6(a)).

Next, the first upper mold 51 and the first lower mold 52 made aforesaid are put together and then the heating resistor portion 1g is molded using an filling molding. Concretely, the material to be mold in which a thermoplastic resin, a plasticizer, a dispersant and solvent are added to powder material of the heating resistor is heated to apply plasticity and then the material is filled into the cavity formed by the first upper mold 51 and first lower mold 52 to mold.

Since the material is filled into the cavity with high pressure when molding, the material is bulged out of the cavity into boundary between the first upper mold 51 and the first lower mold 52, which may makes burrs. However, since in the embodiment the concave portion 52R is formed between the opposing portions of the heating resistor portion 1g in the first lower mold 52 and the protrude portion 51P which is to be fitted to the concave portion 52R is formed in the first upper mold 51, even if the burrs are formed, the distance between the burrs may not be shorter than the width of the concave portion, 51R, thereby ensuring established spacing.

Figure 3A:
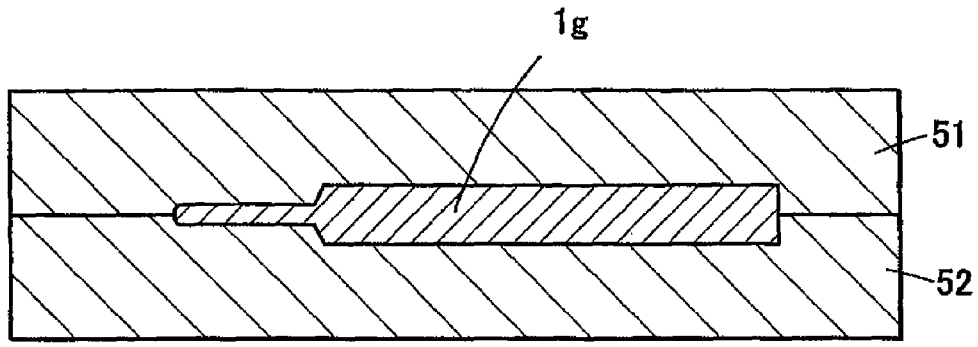
FIG. 3A is a sectional view of a mold when molding a heating resistor portion in the embodiment.
Figure 3B:
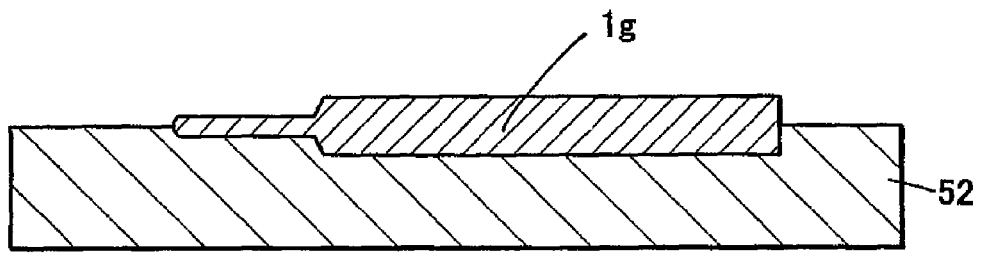
FIG. 3B is a sectional view of a mold when removing the first upper mold after molding a heating resistor portion in the embodiment.
Figure 3C:
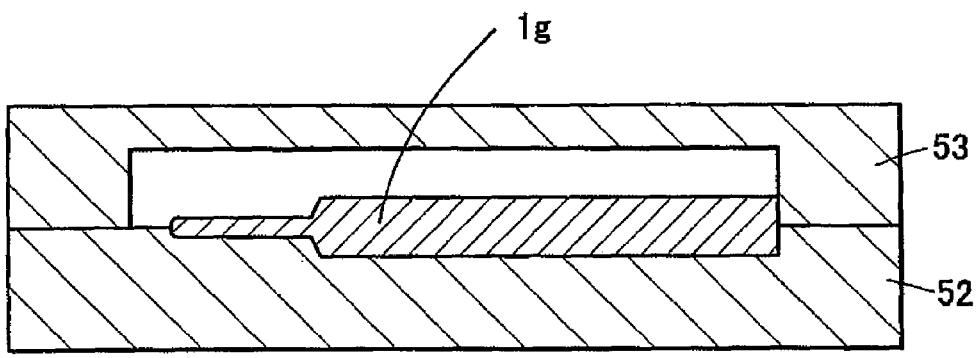
FIG. 3C is a sectional view of a mold when removing the first upper mold and setting a second upper mold after molding a heating resistor portion in the embodiment.

After molding, the first upper mold 51 is separated so that the heating resistor portion 1g remain in the first lower mold 52 (FIG. 3B) and then a second upper mold 53 is set on the first lower mold 52 (FIG. 3C). The second upper mold 53 has a cavity formed in shape corresponding to the upper half shape of the ceramic base. The second upper mold 53 is set on the first lower mold 52 so that the heating resistor portion 1g is placed at a predetermined position of the cavity (FIG. 3C).

Figure 3D:
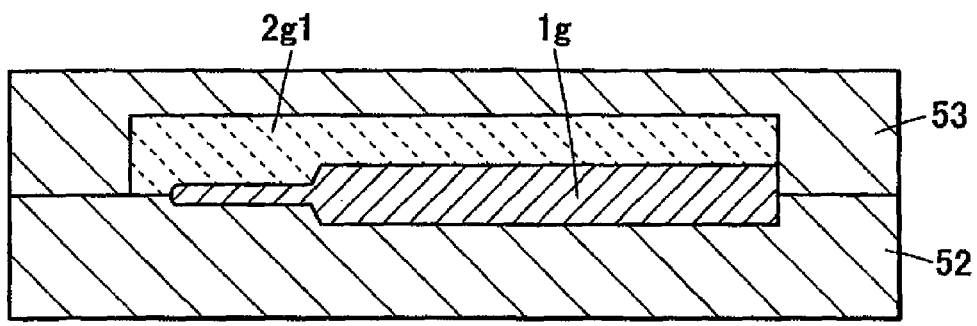
FIG. 3D is a sectional view of a mold when molding a half upper part of a ceramic base after removing the first upper mold and setting a second upper mold in the embodiment.

While staying that state, the ceramic material to be mold in which a thermoplastic resin, a plasticizer, a dispersant and solvent are added to ceramic powder material of the ceramic base is heated to apply plasticity and then filled into the cavity formed by the second upper mold 53 to mold (FIG. 3D). In this way, the upper half portion 2g1 of the ceramic base is formed so as to cover the heating resistor portion 1g.

Figure 3E:
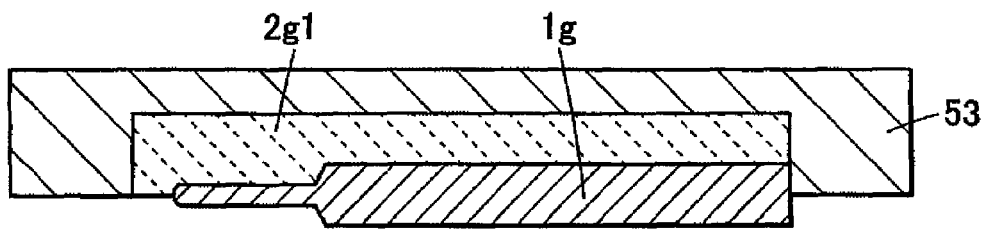
FIG. 3E is a sectional view of a mold when removing the first lower mold after molding a half upper part of a ceramic base in the embodiment.

Next, the first lower mold 52 is separated without removing the molded heating resistor portion 1g and the upper half portion 2g1 of ceramic base from second upper mold 53 (FIG. 3E) and then a second lower mold 54 is set on the second upper mold 53. The second lower mold 54 has a cavity formed in a shape corresponding to the lower half shape of the ceramic base. The second lower mold 54 is positioned so that the heating resistor portion 1g is placed at a predetermined position of the cavity and set on the second upper mold 53 (FIG. 3F).

Figure 3F:
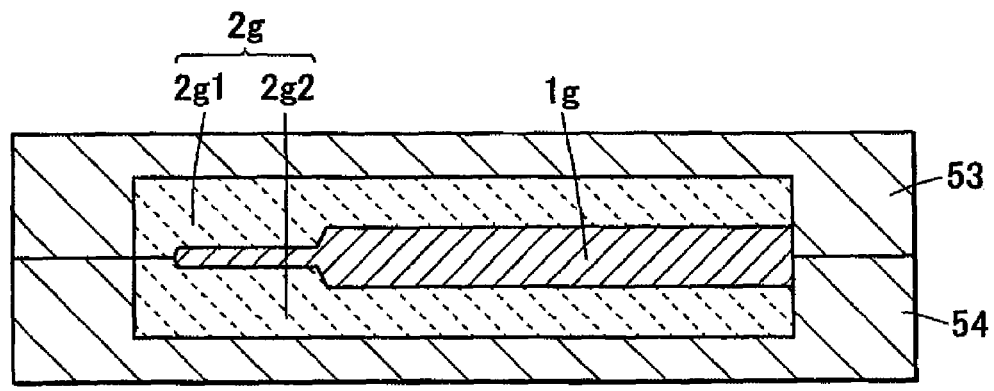
FIG. 3F is a sectional view of a mold when molding a half under part of the ceramic base after removing the first lower mold and setting a second lower mold in the embodiment.

While staying that state, the ceramic material is heated to apply plasticity and then filled into the cavity formed by the second lower mold 54 to mold (FIG. 3F). In this way, the lower half portion 2g2 of the ceramic base is formed to make the ceramic base 2g that the heating resistor portion 1g is embedded inside.

Finally, the ceramic base compact 2g that the heating resistor portion 1g is embedded inside is fired according to a predetermined temperature profile to complete the ceramic heater of the embodiment showed in FIG. 1A and FIG. 1B. For example, a hot press method in which the firing is conducted at a temperature in a range of about 1650° C.-1780° C. at a pressure of about 30-50 MPa under a reduction atmosphere after calcine is given as a firing method.

In the filling molding of the production process, an organic combination such as a wax-type organic material may be used as a binder.

In the ceramic heater of the embodiment manufactured by the method of manufacturing described above, an interval between the burrs formed at the opposing portions when molding the heating resistor portion 1g is not narrower than the width of the concave portion 52R, thereby suppressing occurrence of burrs which cause shorting, which ensures high electrical strength.

Therefore, it is possible to manufacture the ceramic heater of the embodiment at low cost, since step of removing burrs which is inferior in workability may be omitted or be simplified.

In the method of manufacturing the ceramic heater of the embodiment, the first upper mold 51 and the first lower mold 52 are put together to form the heating resistor portion 1g. Next, the first upper mold 51 is replaced by the second upper mold 53 to mold the half upper portion 2g1 and then the first lower mold 52 is replaced by the second lower mold 54 to mold the half lower portion 2g2, thereby manufacturing the ceramic base compact 2g. In this way, it maybe unnecessary to remove the burrs and the successive molding steps in which one of the two molds put together replaced one after another makes it possible to efficiently manufacture the ceramic base compact 2g that the heating resistor portion 1g is embedded inside in the method of manufacturing the ceramic heater of the embodiment. This makes it possible to manufacture the ceramic heater which has a high electrical strength at lower cost.

In the ceramic heater 100, the leading end of the burr formed on one of the two opposing portions and the leading end of the burr formed on the other opposing portion are bended, which keeps a predetermined distance between them without approaching.

However, the present invention is not limited to the embodiment described above, a variety of modifications maybe made as below.

The variety of modifications according to the present invention will be described.

<Modification 1>

Figure 5:
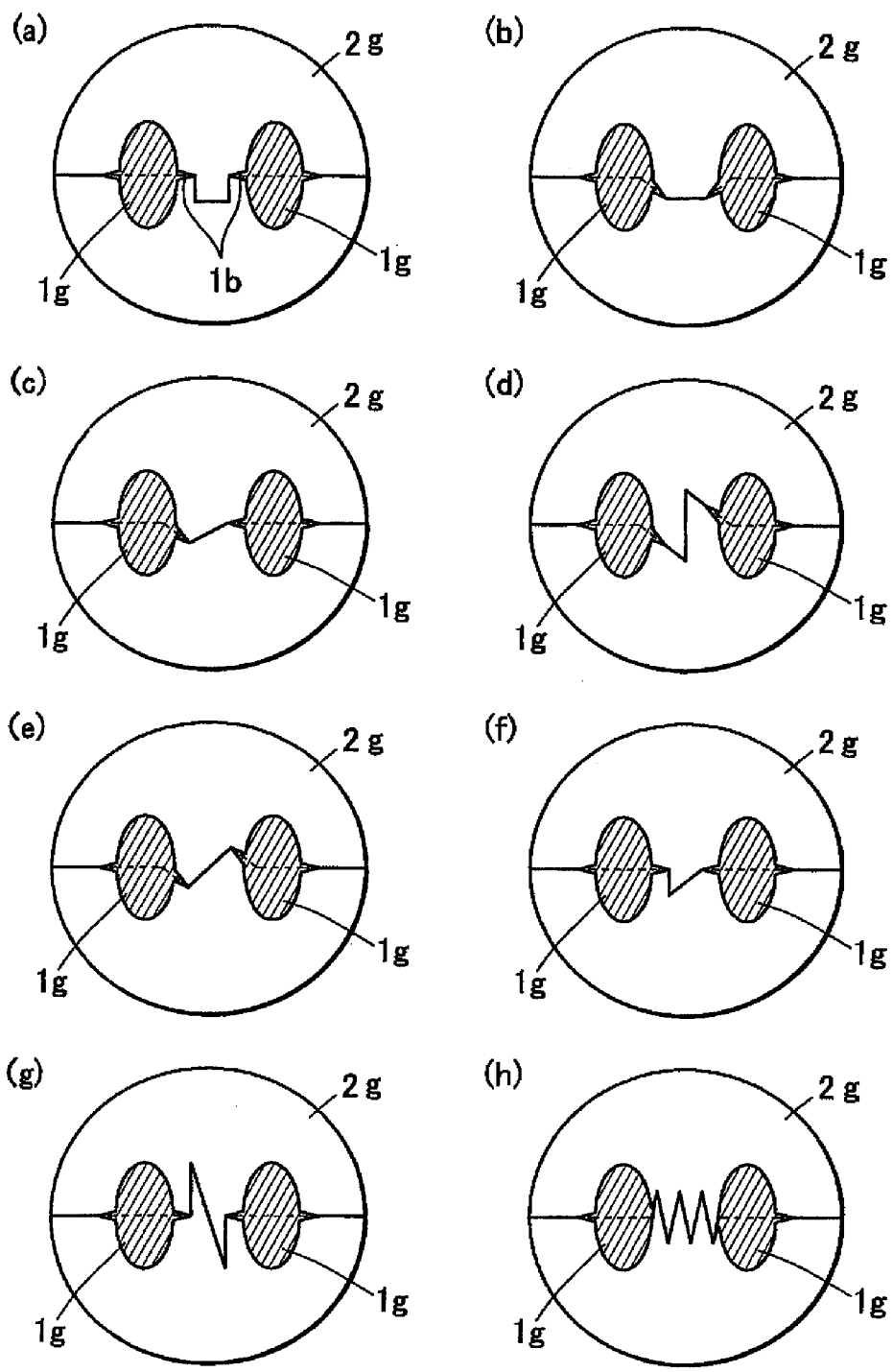
In FIG. 5(a) is a sectional view showing the ceramic heaters of the embodiment according to the present invention and 5(b) to 5(h) are sectional views showing the ceramic heaters of the modifications 2 to 7 according to the present invention respectively.
Figure 6:
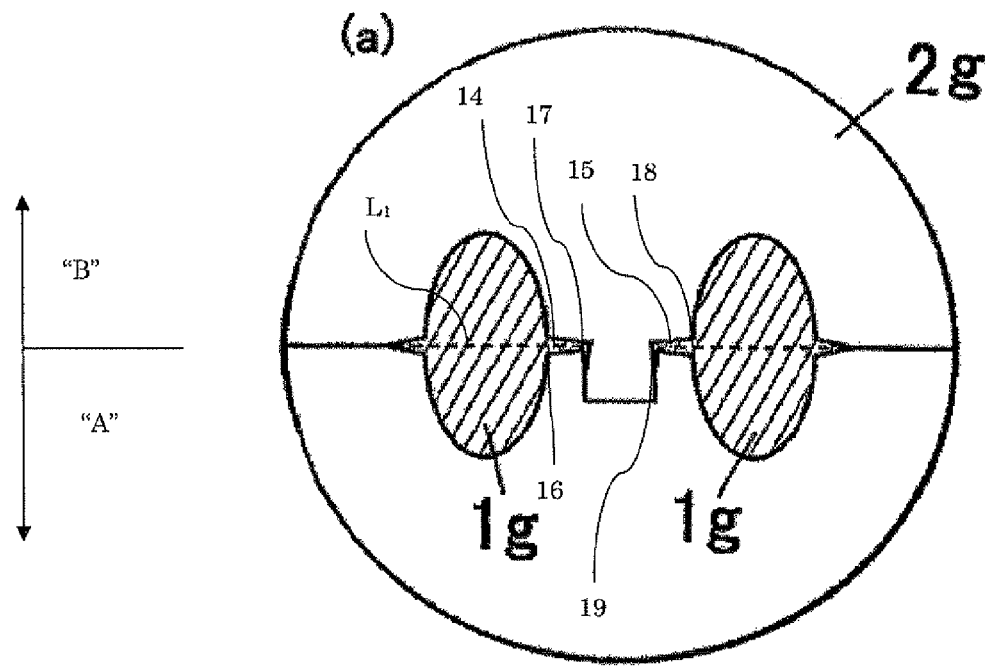
In FIG. 6(a) shows a sectional view on the case where burrs becomes long in the ceramic heater of the embodiment and 6(b) shows a sectional view on the case where burrs become long in the ceramic heater of the modification 6.
Figure 6:
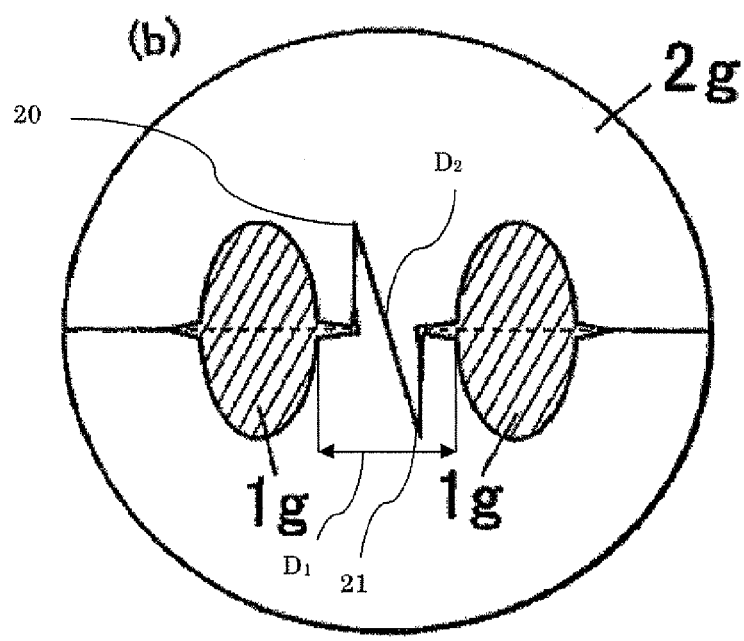

In a ceramic heater of a modification 1 according to the present invention, one burr and the other burr are gradually spaced apart from a line including the starting points of the burrs from the starting point of the burr to the leading end of the burr (FIG. 5(*b*)). That is, in this ceramic heater, both of the leading end of one burr and the leading end of the other burr are in one of regions divided into by the line and are spaced apart from the line in the section of FIG. 5(*b*).

Figure 4:
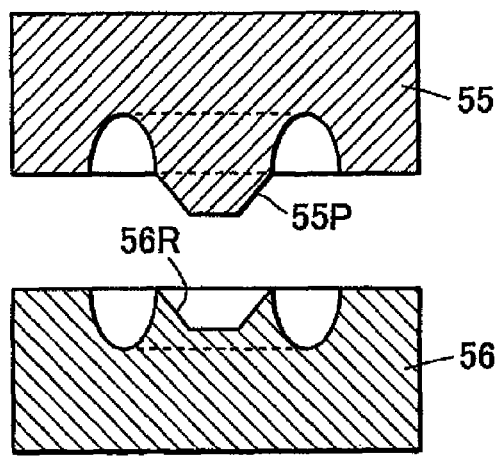
FIG. 4 is a sectional view showing a structure of a mold used for molding a heating resistor portion of ceramic heater in the modification 1.

The ceramic heater of the modification 1 according to the present invention is constituted same as the ceramic heater of the embodiment except that the heating resistor portion 1*g* is molded by using a first upper mold 55 and a first lower mold 56 shown in FIG. 4 instead of the first upper mold 51 and first lower mold 52.

Concretely, the first lower mold 56 has a concave portion 56R different from the concave portion 52R and the first upper mold 55 has a convex portion 55P corresponding to the concave portion 56R in the modification 1. That is, while the concave portion 52R of the first lower mold 52 has a side surface perpendicular to the upper surface, the concave portion 56R of the first lower mold 56 has an inclined side surface and a leading end of the inclined side surface extend to the cavity for molding the heating resistor portion 1*g*.

When the heating resistor 1 is molded using such the first upper mold 55 and the first lower mold 56, the leading end of the burr formed from one of the opposing portions to the other opposing portion and the leading end of the burr formed from the other of the opposing portions to one opposing portion are formed in different directions in the molded heating resistor portion 1*g*. In the ceramic heater of the present modification, in this way, the leading end of one burr formed on one of the opposing portions and the leading end of the other burr formed on the other opposing portion are in one of regions divided into by the line and are spaced apart from the line including the starting points of the burrs in the section perpendicular to a longitudinal direction of the opposing portions.

In the ceramic heater of modification 1 made by using the first upper mold 55 and the first lower mold 56, since a distance between the leading end of the one burr and the leading end of the other burr is larger than that of the conventional heater in which burrs are formed along with the line including starting points of burrs, a electrical strength in the opposing portions may be improved. In addition, since the one burr and the other burr are easily stopped at corners of the concave portion 56R (a line of intersect of the inclined surface and the bottom surface), an interval between the leading ends of the burrs may become not less than width of the bottom surface.

Like the embodiment, in the ceramic heater of the modification 1, the successive molding steps in which one of the two molds put together replaced one after another makes it possible to efficiently manufacture the ceramic base compact 2*g* that the heating resistor portion 1*g* is embedded inside. This makes it possible to manufacture the ceramic heater which has a high electrical strength at lower cost.

<Modification 2>

A ceramic heater of a modification 2 according to the present invention is same as the ceramic heater of the embodiment except that a structure of mold is different from the embodiment when molding. The heating resistor of the modification 2 according to the present invention may be made by firing a ceramic base compact 2*g* shown in FIG. 5(*c*).

Namely, in the modification 2 according to the present invention, as shown in the sectional view of the ceramic base compact 2*g* in FIG. 5(*c*), the first lower mold has a concave portion composed of a first inclined surface and a second inclined surface and the first upper mold has a convex portion corresponding to the shape of the concave portion.

Concretely, the first inclined surface is formed so that the leading end thereof is linked to the cavity in the first lower mold and the burr formed on one of the opposing portions when molding extends toward lower along the first inclined surface. The second inclined surface is formed from the lower end of the first inclined surface toward upper and is linked to the upper surface of the first lower mold spaced apart from the cavity.

When the heating resistor 1 is molded using the first upper mold and the first lower mold constituted above, since the burr formed on one of the opposing portions toward the other opposing portion extends lower along the first inclined surface and the burr formed on the other of the opposing portions toward the one opposing portion extends along the upper surface of the first lower mold in the molded heating resistor portion 1*g*, the extending directions are different from each other. In the ceramic heater of the modification 2, in this way, the leading end of one burr is spaced apart from the line including the starting points of the burrs in the section perpendicular to a longitudinal direction of the opposing portions and the leading end of the other burr is on the line.

In addition, in the modification 2, the burr which extends lower along the first inclined surface may be easily blocked by the second inclined surface at a lower end of the first inclined surface and the burr which extends along the upper surface of the first lower mold may be easily blocked at an upper end of the second inclined surface. Therefore, the interval between the burrs formed on the opposing portions when molding the heating resistor portion 1*g* may be not less than a width of the second inclined surface in the ceramic heater of the modification 2.

Like the embodiment, in the ceramic heater of the modification 2, the successive molding steps in which one of the two molds put together replaced one after another makes it possible to efficiently manufacture the ceramic base compact 2*g* that the heating resistor portion 1*g* is embedded inside. This makes it possible to manufacture the ceramic heater which has a high electrical strength at lower cost.

<Modification 3>

A ceramic heater of a modification 3 according to the present invention is same as the ceramic heater of the embodiment except that a structure of mold is different from the embodiment when molding. The heating resistor of the modification 3 according to the present invention may be made by firing a ceramic base compact 2*g* shown in FIG. 5(*d*).

Namely, in the modification 3 according to the present invention, as shown in the sectional view of the ceramic base compact 2*g* in FIG. 5(*d*), the first lower mold has a first inclined surface which extends one cavity toward lower and a second inclined surface which extends the other cavity toward upper. The first inclined surface and the second inclined surface are linked on a vertical surface parallel to the separation direction of the mold.

When the heating resistor 1 is molded using the first lower mold constituted above and the first upper mold corresponding to the shape of the first upper mold, since the burr formed on one of the opposing portions toward the other opposing portion extends lower along the first inclined surface and the burr formed on the other of the opposing portions toward the one opposing portion extends upper along the second inclined surface in the molded heating resistor portion 1g, the extending directions are different from each other. In the ceramic heater of the modification 3, in this way, the leading end of one burr formed on one of the two opposing portions and the leading end of the other burr formed on the other of the two opposing portions are positioned spaced apart from the line including the starting points of the burrs in the section perpendicular to a longitudinal direction of the opposing portions.

That is, the leading end of the one burr is in one region of the regions divided into by the line and is spaced apart from the line in the section of FIG. 5(d). The leading end of the other burr is in the other region of the regions and is spaced apart from the line.

In the modification 3, the burr which extends lower along the first inclined surface easily stops at the lower end of the first inclined surface by the vertical surface. And the burr which extends along the second inclined surface easily stops at the upper end of the second inclined surface by the vertical surface. Therefore, the interval between the burrs formed on the opposing portions when molding the heating resistor portion 1g may be not less than a width of the vertical surfaces in the ceramic heater of the modification 3.

Like the embodiment, in the ceramic heater of the modification 3, the successive molding steps in which one of the two molds put together replaced one after another makes it possible to efficiently manufacture the ceramic base compact 2g that the heating resistor portion 1g is embedded inside. This makes it possible to manufacture the ceramic heater which has a high electrical strength at lower cost.

<Modification 4>

A ceramic heater of a modification 4 according to the present invention is same as the ceramic heater of the modification 3 except that the vertical surface of the modification 3 is replaced by an inclined surface as shown in FIG. 5(e).

The ceramic heater of the modification 4 constituted above has an operation and effects same as the ceramic heater of the modification 3.

<Modification 5>

A ceramic heater of a modification 5 according to the present invention is same as the ceramic heater of the embodiment except that the concave portion 52R of rectangle shape in a section is replaced by a concave portion of V shape as shown in FIG. 5(f).

The ceramic heater of the modification 5 constituted above has an operation and effects same as the ceramic heater of the embodiment.

<Modification 6>

A ceramic heater of a modification 6 according to the present invention is same as the ceramic heater of the embodiment except that the heating resister portion 1g is molded by using a mold in which a concave and convex portions are formed in a first upper mold and first lower mold respectively as shown in FIG. 5(g).

The ceramic heater of the modification 6 constituted above has an operation and effects same as the ceramic heater of the embodiment.

This mold structure causes burrs to be bent in the reverse direction so that the leading ends of the burrs extend in separated directions without closing even if the burrs become long by wastage of mold as shown in FIG. 6(b). Therefore, it makes a life of mold long, which makes it possible to manufacture at low cost.

<Modification 7>

A ceramic heater of a modification 7 according to the present invention is same as the ceramic heater of the embodiment except that the heating resister portion 1g is molded by using a mold in which a plurality of concave portions of V shape and a plurality of convex portions of V shape are formed in both of a first upper mold and first lower mold respectively as shown in FIG. 5(h).

The ceramic heater of the modification 7 constituted above has an operation and effects same as the ceramic heater of the embodiment.

<Modification 8>

Figure 7:
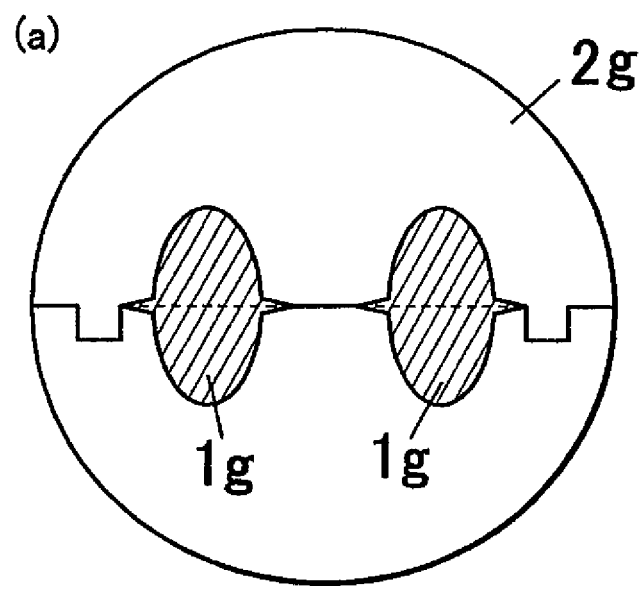
In FIG. 7(a) is a sectional view showing a ceramic heater of the modification 8 according to the present invention and 7(b) is a sectional view showing a ceramic heater of the modification 9 according to the present invention.
Figure 7:
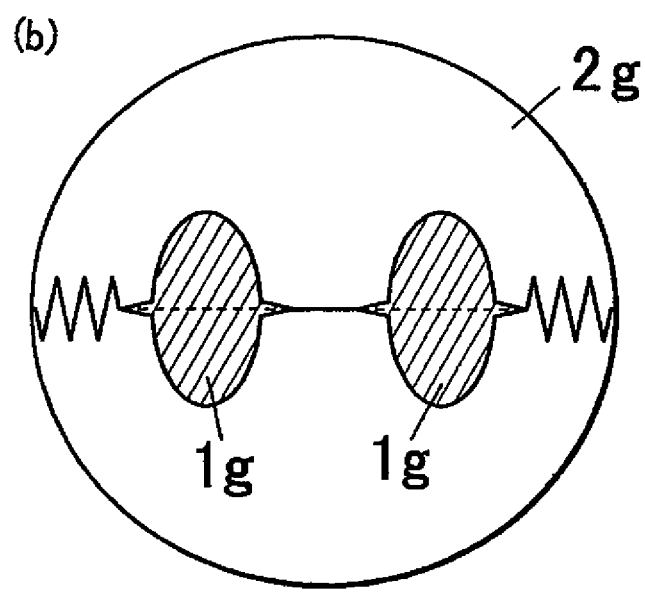

A ceramic heater of a modification 8 according to the present invention is characterized in that the heating resister portion 1g is molded by using a mold in which concave and convex portions are formed between the cavity in which the heating resister is molded and the outer surface in a first upper mold and first lower mold respectively as shown in FIG. 7(a).

In the ceramic heater of the modification 8 constituted above, the lengths of the burrs which extends heating resister to outside are restricted, thereby improving the electrical strength of the ceramics heating resistor.

<Modification 9>

A ceramic heater of a modification 8 according to the present invention is characterized in that the heating resister portion 1g is molded by using a mold in which a plurality of concave portions and a plurality of convex portions are formed between the cavity and the outer surface in both of a first upper mold and first lower mold respectively (steps are formed between the cavity and the outer surface in both of a first upper mold and first lower) so as the burr to be bended or curved more than one time as shown in FIG. 7(b).

In the ceramic heater of the modification 9 constituted above, the lengths of the burrs which extends heating resister to outside are restricted, thereby improving the electrical strength of the ceramics heating resistor.

As shown in the embodiment and kinds of the modifications, the present invention restrains the burrs caused by a mold structure between the conducting portions when molding from closing in the shortest distance in the ceramic heater in which a heating resistor is embedded in the ceramic base. That is, the present invention is characterized in that at least part of the burrs generated between the conducting portions is formed so as to be spaced apart from the line linking a starting point of one burr and a starting point of the other burr (the line linking in the shortest distance) in the ceramic heater in which a heating resistor including the conducting portions opposed each other is embedded in the ceramic base. It is without saying that there are many variations except the embodiment and the modifications described above. For example, an embodiment that a distance between a leading end of the one burr and a leading end of the other burr is longer than a distance between the starting points of the burrs is more preferable.

The invention claimed is:

1. A ceramic heater comprising:
a heating resistor comprising a first conducting portion and a second conducting portion which face each other, the first conducting portion comprising a first burr which extends from the first conducting portion and is located between the first conducting portion and the second conducting portion, the second conducting portion comprising a second burr which extends from the second conducting portion and is located between the first conducting portion and the second conducting portion; and
a ceramic base in which the heating resistor is embedded,
wherein at least a part of at least one of the first and second burrs is spaced apart from a line, the line linking a starting point of the first burr and a starting point of the second burr in a cross-section perpendicular to a conduction direction of the first conducting portion.

2. The ceramic heater according to claim 1,
wherein a leading end of at least one of the first and second burrs is spaced apart from the line.

3. The ceramic heater according to claim 1,
wherein at least one of the first and second burrs is gradually spaced apart from the line from the starting point to a leading end.

4. The ceramic heater according to claim 1,
wherein at least a part of one of the first and second burrs is bent or curved.

5. The ceramic heater according to claim 4,
wherein said at least one of the first and second burrs is bent or curved more than one time.

6. The ceramic heater according to claim 1,
wherein in the cross-section, the line divides the heating resistor into a first region and a second region, and a leading end of the first burr and a leading end of the second burr are in a first region divided into by the line and are spaced apart from the line.

7. The ceramic heater according to claim 1,
wherein in the cross-section, the line divides the heating resistor into a first region and a second region, and a leading end of the first burr is in the first region and is spaced apart from the line, and in the cross-section, a leading end of the second burr is in a second region and is spaced apart from the line, wherein the first region and second regions are different regions.

8. The ceramic heater according to claim 6,
wherein a distance between a leading end of the first burr and a leading end of the second burr is longer than a distance between the starting point of the first burr and the starting point of the second burr.

9. A ceramic heater comprising:
a heating resistor embedded in a ceramic base, the heating resistor comprising a burr between the heating resistor and an outer surface of the ceramic base,
wherein the burr is bent or curved.

10. The ceramic heater according to claim 9,
wherein the burr is bent or curved more than one time.

11. A mold comprising:
a first mold; and
a second mold,
wherein the first mold and the second mold are configured to be put together to form a cavity for molding a heating resistor, such that the heating resistor comprises two opposing portions arranged side by side,
wherein a step is formed between the two opposing portions in a matching surface of each of the first mold and the second mold.

12. A mold comprising:
a first mold; and
a second mold,
wherein the first mold and the second mold are configured to be put together to form a cavity for molding a heating resistor,
wherein a step is formed between the cavity and an outer surface of the first mold and the second mold in a matching surface of each of the first mold and the second mold.

13. A method of manufacturing a ceramic heater in which a heating resistor comprising a first conducting portion and a second conducting portion which face each other is embedded in a ceramic base, the method comprising:
a step of filling a material to be molded including an electrical conductive material into the cavity of the mold according to claim 11 to form the heating resistor.

* * * * *